US012794537B2

United States Patent

(12) United States Patent
Abidrabbu et al.

(10) Patent No.: US 12,794,537 B2
(45) Date of Patent: Nov. 10, 2026

(54) RETRANSMISSION BASED BEAMFORMING

(71) Applicant: Vestel Elektronik Sanayi ve Ticaret A. S., Manisa (TR)

(72) Inventors: Shaima Abidrabbu, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 229 days.

(21) Appl. No.: 18/854,321

(22) PCT Filed: Apr. 6, 2022

(86) PCT No.: PCT/EP2022/059094
§ 371 (c)(1),
(2) Date: Oct. 4, 2024

(87) PCT Pub. No.: WO2023/193896
PCT Pub. Date: Oct. 12, 2023

(65) Prior Publication Data
US 2025/0357990 A1 Nov. 20, 2025

(51) Int. Cl.
*H04B 7/06* (2006.01)
*H04L 1/1822* (2023.01)

(52) U.S. Cl.
CPC ....... *H04B 7/06952* (2023.05); *H04B 7/0617* (2013.01)

(58) Field of Classification Search
CPC .. H04B 7/06952; H04B 7/0671; H04L 1/1822
USPC .......................................... 370/252, 329, 430
See application file for complete search history.

(56) References Cited

U.S. PATENT DOCUMENTS

| | | | | |
|---|---|---|---|---|
| 12,431,956 | B2 * | 9/2025 | Lim | H04B 7/088 |
| 2013/0072247 | A1 | 3/2013 | Park et al. | |
| 2019/0222279 | A1 * | 7/2019 | Xi | H04B 7/063 |
| 2022/0225121 | A1 * | 7/2022 | Wanuga | H04B 7/088 |

FOREIGN PATENT DOCUMENTS

EP 2645592 A1 10/2013

* cited by examiner

*Primary Examiner* — John Pezzlo
(74) *Attorney, Agent, or Firm* — The Webb Law Firm

(57) ABSTRACT

Methods and apparatuses are described for retransmission of data in a wireless communication. The width of the beam used for retransmission is chosen based on whether the line-of-sight (LOS) between transmitter and receiver is blocked.

19 Claims, 8 Drawing Sheets

RETRANSMISSION BASED BEAMFORMING

CROSS-REFERENCE TO RELATED APPLICATION

This application is the United States national phase of International Patent Application No. PCT/EP2022/059094 filed Apr. 6, 2022, the disclosure of which is hereby incorporated by reference in its entirety.

The present disclosure relates to a method and device for retransmission of data in wireless communication.

BACKGROUND

Field

Wireless communication has been advancing over several decades now. Exemplary notable standards organizations comprise the 3rd Generation Partnership Project (3GPP) and IEEE 802.11, commonly referred to as Wi-Fi.

In any wireless communication, the transmission of data may fail due to various reasons.

Technical Considerations

Retransmission is an effective way to improve performance of wireless communication systems, wherein packet retransmission is often requested when an error is determined in the received packet. For instance, an automatic retransmission request (ARQ) may ensure a low packet error rate.

The efficiency of ARQ may be improved by reusing the data from the previous (re) transmissions instead of discarding them. This technique, termed the hybrid ARQ (HARQ), includes the Chase Combining (CC) and Incremental Redundancy (IR). HARQ is supported in the LTE system for reliable data transmission together with Multiple Input Multiple Output (MIMO).

However, when the reception quality of a signal deteriorates, this may affect a retransmission alike.

SUMMARY

The motivation of this disclosure is to provide robustness for communication links.

Methods and devices are described herein for wireless communication implementing a beamforming-based retransmission strategy that may enhance system performance.

According to an embodiment, a communication device is provided for wireless communication with another communication device, comprising: a transceiver section configured to transmit data to the other communication device using a first beam; and processing circuitry configured to determine whether the line of sight path to the other communication device is blocked, wherein the transceiver section is further configured to retransmit the data using a second beam, wherein when no blockage of the line of sight path is detected, the beamwidth of the second beam is set to a first width; and when a blockage of the line of sight path is detected, the beamwidth is set to a second width, wherein the second width is larger than the first width.

According to further embodiments, apparatuses are provided for transmission and reception of the signals which comprise processing circuitry configured to perform the steps of the respective transmitting and receiving methods, as well as a transceiver configured to receive or transmit the signals.

The above-mentioned circuitry may be any circuitry such as processing circuitry comprising one or more processors and/or other circuitry elements.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of “a,” “an,” and “the” comprise plural referents unless the context clearly dictates otherwise.

BRIEF DESCRIPTION OF THE DRAWINGS

The terms FIG., FIGS., Figure, and Figures are used interchangeably in the specification to refer to the corresponding figures in the drawings.

An understanding of the nature and advantages of various embodiments may be realized by reference to the following figures.

DESCRIPTION

Figure 2:
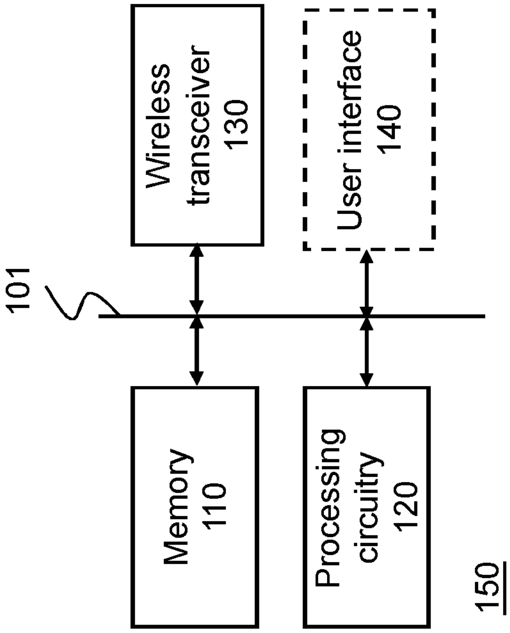
FIG. 2 is a block diagram illustrating a transmitting and/or receiving device.

For purposes of the description hereinafter, the terms “end,” “upper,” “lower,” “right,” “left,” “vertical,” “horizontal,” “top,” “bottom,” “lateral,” “longitudinal,” and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to comprise one or more items and may be used interchangeably with "one or more" and "at least one." Furthermore, as used herein, the term "set" is intended to comprise one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Figure 1:
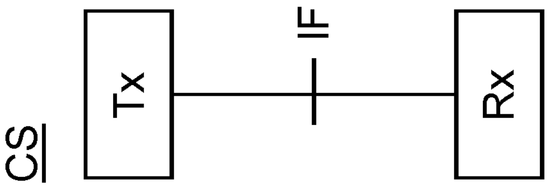
FIG. 1 is a block diagram illustrating an exemplary communication system.

FIG. 1 illustrates an exemplary communication system CS in which Tx represents a transmitter and Rx represents a receiver. The transmitter Tx is capable of transmitting a signal to the receiver Rx over an interface IF. The interface may be, for instance, a wireless interface. The interface may be specified by means of resources, which can be used for the transmission and reception by the transmitter Tx and the receiver Rx. Such resources may be defined in one or more (or all) of the time domain, frequency domain, code domain, and/or space domain. It is noted that in general, the "transmitter" and "receiver" may be also both integrated in the same device. In other words, the devices Tx and Rx in FIG. 1 may respectively also comprise the functionality of the Rx and Tx.

The present disclosure is not limited to any particular transmitter Tx, receiver Rx and/or interface IF implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11be or the like.

IEEE 802.11, commonly referred to as Wi-Fi, has been around for three decades and has become arguably one of the most popular wireless communication standards with billions of devices supporting more than half of the worldwide wireless traffic. The increasing user demands in terms of throughput, capacity, latency, spectrum and power efficiency calls for updates or amendments to the standard to keep up with them. As such, Wi-Fi generally has a new amendment after every 5 years with its own characteristic features. In the earlier generations, the focus was primarily higher data rates, but with ever increasing density of devices, area efficiency has become a concern for Wi-Fi networks. Due to this issue, the last (802.11ax) and upcoming (802.11be) amendments have focused more on the efficiency issue.

FIG. 2 illustrates a transmitting device 150 according to some exemplary embodiments. The transmitting device 150 may be a part of any wireless communication device such as STA or AP, or, in general base station or terminal. The transmitting device 150 comprises memory 110, processing circuitry 120, and a wireless transceiver 130 (or a wireless transmitter), which may be capable of communicating with each other via a bus 101. The transmitting device 150 may further comprise a user interface 140. However, for some applications, the user interface 140 is not necessary (for instance some devices for machine-to-machine communications or the like).

The memory 110 may store a plurality of firmware and/or software modules, which implement some embodiments of the present disclosure. The memory 110 may be read from by the processing circuitry 120. Thereby, the processing circuitry may be configured to carry out the firmware/software implementing the embodiments. The processing circuitry 120 may comprise one or more processors, which, in operation, may perform the method steps shown in FIG. 9 or FIG. 10. The wireless transceiver 130, in operation, transmits the generated transmission signal.

Retransmission may be an effective way to improve performance of wireless communication systems, wherein packet retransmission is often requested when an error is determined in the received packet. An automatic retransmission request (ARQ) may ensure an extremely low packet error rate.

The efficiency of ARQ may be improved by reusing the data from the previous (re) transmissions instead of discarding them. This technique, termed the hybrid ARQ (HARQ), comprises the Chase Combining (CC) and Incremental Redundancy (IR). HARQ is supported in the LTE system for reliable data transmission together with Multiple Input Multiple Output (MIMO).

Combined with HARQ, MIMO may potentially provide higher throughput packet data services with higher reliability. MIMO equipped with a high number of antennas at the base station can communicate with multiple users simultaneously. Since the number of antennas is limited in a massive MIMO base station, if the number of users becomes more than the number of antennas, a proper user scheduling scheme may be applied before precoding to achieve a higher throughput and sum-rate performance.

Next-generation cellular communication systems, or 5G, will be assisted by technologies that produce significant improvements in cell throughput. In recent years, various studies have focused on massive MIMO systems, which are considered to play a significant role in 5G. Massive MIMO systems are MIMO systems wherein the precoders and/or detectors contain numerous antennas. Such large number of antennas enable higher spectral efficiency and energy efficiency.

Several types of antennas can be used for this purpose, one of which is called a smart antenna. Smart antennas are organizations of numerous antenna elements at BSs and mobile stations of wireless communication links, in which signals are appropriately managed, to improve the wireless mobile link and increase the performance of the system.

Beamforming is the application of multiple radiating elements transmitting the same signal at an identical wavelength and a fixed phase, which combine to create a single antenna with a longer, more targeted stream that is formed by reinforcing the waves in a specific direction.

In wireless communication systems, transmit and receive beamforming is used for signal transmission from BSs with multiple antennas to one or multiple pieces of user equipment that should be covered. The objective of transmit beamforming is to maximize each user's received signal power while minimizing the interference signal power from the other users, hence increasing capacity. This can be achieved by transmitting the same signal from all transmitters with different amplitudes and phases. These multiple versions of the transmitted signal will pass through different MIMO channels such that they are added constructively at the desired users and destructively at other users.

The successful operation of MIMO systems requires the implementation of powerful digital signal processors and may make use of an environment with lots of signal interference, or "spatial diversity"; that is a rich diversity of signal paths between the transmitter and the receiver.

The diversity of arrival times, as the signal is reflected from different obstacles, forms multiple paths that can deliver path redundancy for duplicate signals or increase the channel reliability by transmitting different parts of the modulated data.

As mentioned above, beamforming is the application of multiple radiating elements transmitting the same signal at an identical wavelength and a fixed phase, which combine to create a single antenna with a longer, more targeted stream that is formed by reinforcing the waves in a specific direction.

The more radiating elements make up the antenna, the narrower the beam can be. An artifact of beamforming is side lobes being radiated in other directions than the main lobe. The more radiating elements that make up the antenna, the more focused the main beam is and the weaker the side lobes are. While digital beamforming at the baseband processor is mostly used today, analog beamforming in the RF domain may provide antenna gains that mitigate the lossy nature of 5G millimeter waves.

Meanwhile, array processing, such as beamforming is playing a role in fulfilling the increased demands of various communication services. The beamforming technique is based on the antenna array with a small inter-element distance, and it can cancel or coherently combine the multipath components of the desired signal and restrain interfering signals that have different directions. For instance, beamforming has been implemented in the Time Division-Synchronous Code Division Multiple Access (TD-SCDMA) system.

Beamforming is already supported for Time Division Duplex (TDD) mode of recent 3GPP systems (e.g. NR TDD, LTE TDD) thanks to the channel reciprocity; however, only a single antenna port is available for transmitting one stream of data. For example, in LTE-Advanced system, enhancement of beamforming which can support multi-stream transmission has been considered to further improve the system capacity.

Link adaptation, comprising adaptive coding and modulation (ACM) and others (such as Power Control), is a term used in wireless communications to denote the matching of the modulation, coding, and other signal and protocol parameters to the conditions on the radio link (e.g., the path loss, the interference due to signals coming from other transmitters, the sensitivity of the receiver, the available transmitter power margin, etc.). Diversity can be applied on both the receiver side (receives diversity) and the transmitter side (transmits diversity). When using diversity, the antennas may have a low mutual correlation, since diversity is a way of combating fading on the radio channel. For receive diversity, different types of combinations of received signals can be used, such as Maximum-Ratio Combining (MRC) and Interference Rejection Combination (IRC).

User relaying schemes may use jointly designed linear beamformers for different transmission phases for minimization of the transmission time required until both users have received their required amount of information. HARQ may be used as an adapting retransmission protocol.

However, when the reception quality of a signal deteriorates, this may affect a retransmission alike.

In some embodiments, optimizing the beam form may lead to concentrating energy towards a specific region by directional communication which eliminates multipath in the environment and poorly scatters the transmitted signals. Therefore, the communication is easily interrupted by any obstacle in the beam direction. The line of sight (LOS) path is prone to more signal attenuation in comparison to indirect paths or NLOS paths under blockage conditions.

In general, retransmission schemes may improve the throughput and reliability in wireless transmission. When a packet is not received without an error, the packet may be retransmitted and the receiving side can use the retransmitted packet and, optionally, the originally received version of the packet to decode the data comprised in the packet.

In transmission schemes involving multiple antennas either on one of or on both of the transmitting side and the receiving side, diversity and/or beamforming schemes may be used for both or one of the transmission of original packets and retransmitted packets.

Figure 3:
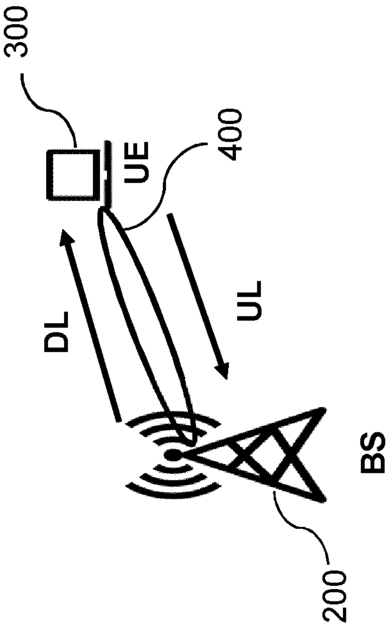
FIG. 3 is a schematic drawing of a communication system.

The exemplary wireless communication system shown in FIG. 3 comprises one base station (BS) 200 that comprises multiple antennas. The BS may use beamforming to serve multiple users in the network. For simplicity purposes only, FIG. 3 shows one user 300 out of the multiple users. However, the BS may also serve two users or any number of users, for example with beams having different directionality and/or power. Furthermore, in this example the user 300 may have one antenna. Alternatively, the user may have multiple antennas.

In this example, the network uses time division duplexing (TDD) mode. From this, the channel reciprocity may be used as feedback between the user and the BS. In other words, in the TDD mode, uplink and downlink are time-multiplexed, so that in general uplink reception quality may be used to estimate downlink reception quality and vice versa.

In an exemplary state of the communication system, beam training may be completed before transmission of data. However, a retransmission of transmitted data may still become necessary if errors occur during the data transmission. This may be the case, for instance, because the beam is blocked. In the example shown in FIG. 3, the beam is directed towards the line-of-sight (LOS) between the BS 200 and the UE 300. An object blocking this LOS may lead to a blockage of the beam.

The above-mentioned retransmission may be triggered according an (H) ARQ protocol. The present disclosure is not limited to any particular (H) ARQ protocol. For example, a retransmission may be requested by the user, e.g., by sending a negative acknowledgement or the like. Here, when referring to a user, what is meant is a user device, such as a UE or STA. Alternatively, the BS may have failed to receive an acknowledgement for data that was sent to the user (e.g., within a predetermined time and/or within other predetermined resources) and consequently, the BS may decide to retransmit the data. In other words, the retransmission of data may be performed upon explicit request of the receiving side or it can be triggered by determining that a positive acknowledgement has not been received as expected. As is known in the art, the receiving side (user) may determine whether the data have been received correctly, e.g., by applying an error detection approach such as checking the cyclic redundancy check (CRC) code attached to the data. The present disclosure is not limited to any particular determination whether the data have been received and/or whether the received data could be decoded correctly (with or without combining of different redundancy versions as in the HARQ approaches).

For example, the communication system shown in FIG. 3 may be an indoor communication system. However, the communication system may also be an outdoor communication system and may be for short range communication or long range communication or any kind of wireless network. In the millimeter-wave band, multipath reflection can be suppressed by using circular polarization and narrow-beamwidth receiving antennas. Therefore, indoor communication systems may use millimeter-wave to keep the direct connection between base stations and remote terminals.

Human bodies may block the propagation paths in the 60 GHz band (may also be related to as mm-wave) in the indoor environment. This may break mm-wave links. The mm-wave links may be vulnerable to blockage by the human body which is mainly comprised of water. Several kinds of blockages are possible and ways to detect blockage will be discussed later. For instance, received signal strength indicator (RSSI) variation may be used to detect a blockage on the mm-wave link during a time window. In some embodiments, an indication of blockage may be determined when the RSSI indicates low signal strength over a larger bandwidth. It is noticed that RSSI is only an exemplary measure for indicating signal quality or signal strength. Any alternative measure may be used as well. For example, Signal to Noise Ration (SNR), pathloss, or other parameters.

Antenna beamforming may play a key role in achieving robustness to LOS blockage. Measures adopted to counter LOS blockage may comprise beam steering towards non-line of sight (NLOS) links and/or the use of reflectors and/or relay-based schemes. Since the changes in the RSSI are changed based on TDD mode, this means that a blockage is happening in the system and could be due to, for instance, human blockage or object moving.

Examples for objective moving may comprise a relative movement between the transmitter and the receiver. Several methods may be used to measure this comprising a Doppler-based measurement and/or tracking approaches possibly using coarse-detection and/or fine-detection.

Attenuation of received signal strength (RSS) caused when a human blocks a LOS path, called human blockage, is an open issue in mm-Wave communications. Concentrating energy towards a specific region by directional communication eliminates multipath in the environment and poorly scatters the transmitted signals. Therefore, the communication may be easily interrupted by any obstacle in the antenna direction. As a common result of the prior art studies, the LOS path is prone to more signal attenuation in comparison to indirect paths or NLOS paths under blockage conditions.

A goal of the present disclosure may be providing robustness for communication links against blockage by exploiting the beam specification to do the retransmission. Based on the prior art, different kinds of blockage may exist as, for instance, human blockage impact and/or objective moving.

New retransmission strategies are proposed that are compatible with HARQ protocol-based mm-wave and that may increase the signal-to-noise ratio (SNR) by exploiting the beam properties, increasing the robustness of delay, and/or overcoming the blockage.

Figure 5:
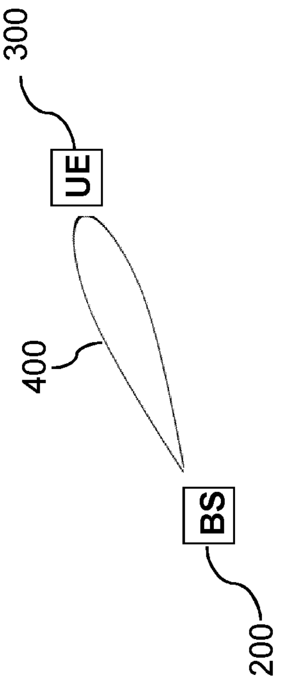
FIG. 5 is a schematic drawing of a communication system using a directed beam.
Figure 8:
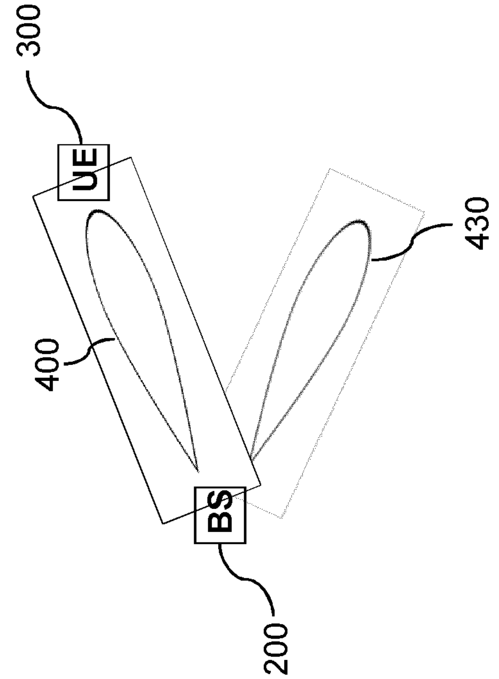
FIG. 8 is a schematic drawing of a communication system using a beam with a different directivity for retransmission.

According to some embodiments, a communication device 100 transmits data to another communication device. FIG. 5 exemplarily shows a base station 200 transmitting a beam 400 to a user equipment 300.

In some embodiments, the base station 200 may be a communication device 100 communicating with another communication device and UE 300 may be the other communication device. However, the present disclosure is not limited thereto. The beam may also be transmitted from the user equipment to the base station and all embodiments and examples described in the following may apply to any device transmitting, and where applicable retransmitting, a beam to any other device. For instance, beam 400 may be transmitted and possibly retransmitted from a user equipment to another user equipment and all strategies described in the following may be pursued in such sidelink communication, too. Only exemplarily, methods and strategies for retransmission are described in a transmission from a base station to a user equipment in the following.

Figure 4A:
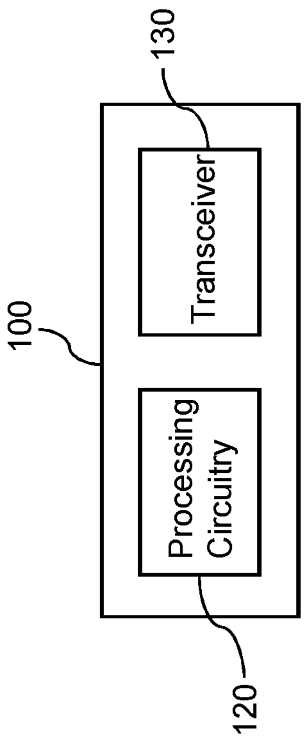
FIG. 4A is a block diagram illustrating a transmitting and/or receiving device.
Figure 4B:
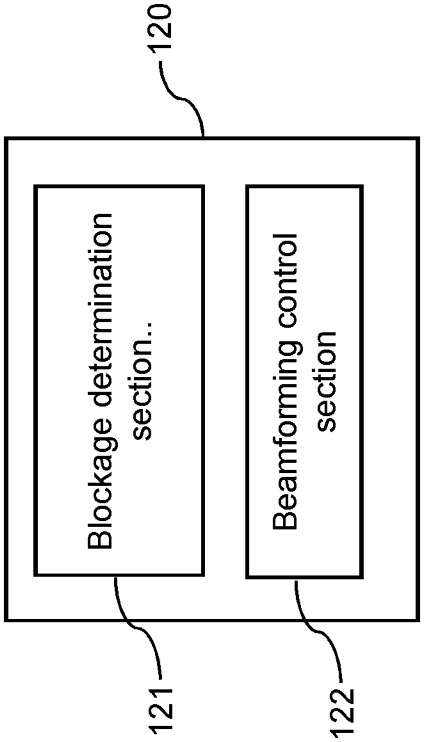
FIG. 4B is a block diagram illustrating processing circuitry of a transmitting device.

The communication device 100 according to the present embodiment comprises a transceiver 130 used to transmit data to the other communication device using beam 400. Beam 400 may be a beam along the line of sight (LOS) between base station 200 and user equipment 300. In some embodiments, beam 400 may have a certain width and the beam 400 may have been optimized using beamforming training. In some embodiments, the communication device 100 according to the present disclosure may comprise processing circuitry 120. An example for processing circuitry 120 is shown in FIG. 4B.

According to some embodiments, communication device 100 may comprise all features of communication device 150 shown in FIG. 2. In some embodiments, communication device 100 may further comprise memory 110 and user interface 140. In some embodiments, transceiver 130 may be a transmitter Tx as shown in FIG. 1 and the other communication device may be a communication device as shown in FIG. 2, too. In some embodiments, the other communication device may comprise a transceiver 130 that may correspond to receiver Rx in FIG. 1 in this scenario.

In some embodiments, the BS 200 may transmit data to the UE 300 using beam 400 as shown in FIG. 5. The UE 300 may then check, using forward error correction (FEC), if the data is received within an acceptable range of reliability. Measures of reliability may be, but are not limited to, RSSI and SNR. If data is not received within an acceptable range of reliability, UE 300 may ask the BS 200 to retransmit the same data packet. For instance, UE 300 may send a NACK message to BS 200.

However, the present disclosure is not limited to determining that retransmission is needed using feedback from the UE 300. For instance, BS 200 may determine that retransmission is necessary based on a missing acknowledgement. However, the communication device 100, which is a BS in this example, is not limited to any particular transmission/retransmission protocol. Any protocol may be used to determine whether retransmission is necessary.

Before the communication device 100 according to some embodiments retransmits data, the processing circuitry 120 may determine whether the LOS is blocked. In some embodiments, this may be done by blockage determination section 121.

In some embodiments, BS 200 may determine whether the line of sight is blocked without first determining whether a retransmission is necessary. In some embodiments, BS 200 may determine from the LOS being blocked that retransmission is necessary. For instance, data may initially be transmitted with a directed beam along the LOS path. When BS 200 determines that the LOS path is blocked, BS 200 may determine that retransmission is necessary and retransmit the data using any of the retransmission strategies described below.

Blockage detection may be done using various methods. One exemplary method using the channel estimation and tracking approach may comprise:

1. Defining the channel model for the environment comprising the evolution models for channel gains and angles of arrival and departure, as well as the statistics of blockage events.
2. Then, a change point detection test may be defined to identify the time instants where blockage appears/disappears, so the appropriate channel evolution models can be used for wideband channel tracking during the blockage events.
3. Then, one of a plurality of frameworks may be used for integration comprising, for instance, Bayesian and MMSE channel tracking algorithms.

It is noted that the determination of blockage can be performed in various ways known from the art. As mentioned above, a blockage may be indicated in case there is a drop in channel quality in a wide band, e.g., in the entire system band. Alternatively, several channel quality parameters may be collected and input to a machine learning module trained for this purpose to determine whether or not a blockage occurs.

Figure 6:
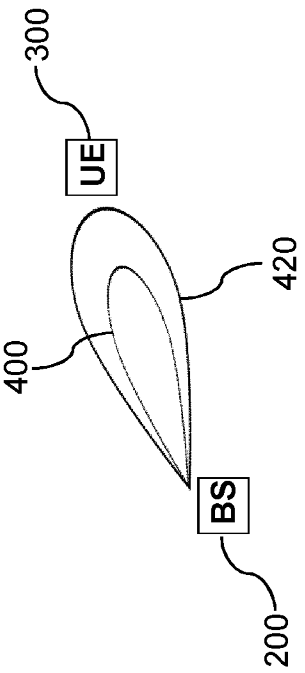
FIG. 6 is a schematic drawing of a communication system using a broader beam for retransmission.

Independent of how and in which order it was determined that retransmission is necessary and/or the LOS is blocked, the transceiver 130 in the communication device 100 according to some embodiments may retransmit the data using a second beam having a width that is different from the width of beam 400. The second beam width may be determined according to the result of the blockage determination. An example for a retransmission when the LOS is blocked is shown in FIG. 6.

When it is determined that the LOS path is not blocked or when no blockage is detected, a first width is used for the beam that is used for retransmission. When it is determined that the LOS path is blocked, the width of the beam that is used for retransmission is set to a second width. The width of beam 400 used in the original transmission may also be referred to as the third width.

Retransmitting the data with a beam having a width depending on the result of determination whether the LOS is blocked or not may improve the retransmission. For instance, the reliability or quality of the received re-transmitted signal may be improved or the probability of receiving the retransmitted signal within an acceptable range of reliability may be increased.

In some embodiments, when it is determined by the transmitting device that the LOS to the receiving device is blocked, the width of the second beam 420 used for retransmission is set to a larger width than the width of beam 400 which was used in the original transmission. In this example, second beam 420 has the same direction as beam 400. However, second beam 420 may also be transmitted by the transmitting device in another direction. For instance, second beam 420 may be transmitted in a direction that is chosen such that the beam may be reflected from other objects on alternative paths between the communication device (in the example, BS 200) and the other communication device (in this example, UE 300).

In some embodiments, the transmitting device (for example BS 200) may be communication device 100 with transceiver 130 transmitting signals to the receiving device (for example, UE 300) and processing circuitry 120 determining whether retransmission is necessary, determining whether the LOS to the receiving device is blocked, setting a beamwidth and/or choosing a beam direction. In some embodiments, beamwidth and/or beam direction may be set by beamforming control section 122.

However, in the example shown in FIG. 6, the first beam 400 carrying the data and the second beam 420 carrying the re-transmitted data are transmitted by transceiver 130 of the transmitting device with the same directionality. Retransmitting the data in a broader beam 420 may improve the received signal when the original, narrower, beam 400 was blocked by an object. In some embodiments, beam 400 may be entirely absorbed or reflected unfavorably by an object while beam 420 may be, at the position where the beam hits the object, broader than the object and thus a portion of beam 420 may pass the object.

Figure 7:
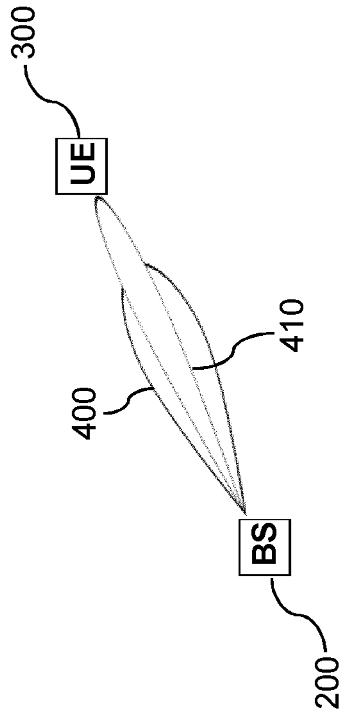
FIG. 7 is a schematic drawing of a communication system using a narrower beam for retransmission.

Another exemplary embodiment is shown in FIG. 7. In this exemplary embodiment, when it is determined (e.g., by processing circuitry 120 of the transmitting device 100) that the LOS is not blocked, the width of the beam used for retransmission (in the example shown in FIG. 7, beam 410 is used for retransmission) is smaller than the width of the beam used for the original transmission (beam 400 in the example shown in FIG. 7).

When it is determined by the transmitting device that retransmission of data originally transmitted in beam 400 is necessary, and it is determined that the LOS path is not blocked, making the beam narrower for the retransmission (beam 410) may improve the signal at the receiving device 300 (for example but not limited thereto, the receiving device may be a user equipment 300 and the transmitting device 200 may be a base station).

In another exemplary embodiment, when it is determined by transmitting device 200 that retransmission is necessary, it is further determined whether the LOS path is blocked or not. When it is determined that the LOS path is blocked, beam 420 is used for retransmission. In some embodiments, when it is determined that the LOS is blocked, the beam used for retransmission has a width that is larger than the width of the beam used in the original transmission. When it is determined that the LOS is not blocked, the beam used for retransmission (e.g., beam 410 in the example shown in FIG. 7) has a width that is smaller than the width of beam 400 used in the original transmission.

According to some embodiments, the reception quality of the retransmitted data may be improved by making the beam narrower compared to the original transmission when the LOS is not blocked and when the LOS is blocked, making the beam wider may lead to higher chances of the retransmission not being blocked.

In some embodiments described herein, the beam used for the original transmission from the transmitting device to the receiving device and the beam used for retransmission from the transmitting device to the receiving device are transmitted in the same direction.

However, in some embodiments, the retransmitted beam may be transmitted from the transmitting device to the receiving device into a direction that differs from the direction of the beam used for the original transmission from the transmitting device to the receiving device.

This may be done independently from determining whether the LOS path is blocked or dependent on the result of a determination whether the LOS path is blocked.

In some embodiments, when it is determined that the LOS path is blocked, the beam used for retransmission may be transmitted from the transmitting device to the receiving device in a different direction than the beam used for the original transmission. Although this may already be beneficial when the beam used for retransmission has the same width as the beam used for the original transmission, according to some embodiments, the beam used for retransmission may also have a different width.

For instance, when it is determined that retransmission is necessary, and it is determined that the LOS path is blocked, the retransmission may use a beam with a different direction than the beam used in the original transmission and having a larger width (being broader) than the beam used for the original transmission.

This may be beneficial in a number of situations. One of these situations may be when beamforming has been completed and data is transmitted from the transmitting device to the receiving device using the beam determined by the beamforming. This may be a rather narrow beam that is optimized for achieving a good signal quality at the receiver. However, when the LOS path is blocked, retransmitting the signal into a different direction using a beam with the same width as that of the beam used for the original transmission may not be optimal as the rather narrow beam may miss the receiver directly (and possibly also reflections may miss the receiver). Consequently, it may be beneficial to use a beam for retransmission that is transmitted into a different direction than the beam used for the original transmission and is broader.

Alternatively, the beam used for retransmission may have a different directionality and may be narrower than the beam used for the original transmission. For instance, when beamforming is completed and different suitable directions for the beam used for transmission are determined, the transmitter used a beam in the direction that was determined as the best of the suitable directions in beamforming, which may be the LOS path. The width of this beam may be chosen as a compromise of the received signal having a good quality (for instance, a good SNR or RSSI) and the transmission being robust regarding positional and/or rotational changes between the transmitting and the receiving device.

When the path used for the original transmission is blocked, a different path may be chosen for retransmission. This different path may correspond to one of the other suitable beam directions, which may have been determined in beamforming. As the SNR of a retransmitted signal using the other suitable beam may be worse than the SNR of the signal using the optimal beam (e.g., in LOS direction), it may be beneficial to make the beam used for the retransmission narrower which may increase signal strength at the receiver.

Consequently, a robust transmission may be achieved for the original transmission, and in case of a blockage of the LOS path, the retransmission along a different path may still have a good quality or reliability due to using a narrower beam.

However, when it is determined that the LOS path is not blocked, it may be advantageous to retransmit the data using a beam with the same width as or being broader than the beam used for the original transmission.

According to some embodiments, retransmission is performed on the physical (PHY) layer. In some embodiments, according to a modification of the present embodiment, retransmission and virtual combining is performed on the PHY layer. This may lead to a faster and more reliable communication.

Alternatively, in some embodiments retransmission and virtual combining may be performed on the MAC layer.

Virtual combining could be based on any algorithm based on the combining design at the receiver and could be based on, but is not limited to, specific types like MRC or selective combining.

The design may be based on the network and/or user requirements. This may provide flexibility to design the receiver at specific objectives regarding increasing the SNR and minimizing the bit error rate.

According to some embodiments, communication device 100, after transmitting data, determines whether a retransmission is necessary.

For instance, according to some embodiments, the base station 200 transmits a packet or (also called data packet or data) to user equipment 300. The user equipment receives the packet and, based on a forward error correction (FEC) check and the reliability level of the system requirement, stores the data and possibly asks for retransmission of the same by sending a negative acknowledgement (NACK) to the base station. By receiving the NACK, the base station determines that retransmission is necessary.

However, the determining whether retransmission is necessary is not limited thereto and any transmission/retransmission protocol may be used as described above.

As also described above, the original transmission and the retransmission may be transmitted from a transmitting device to a receiving device. However, the receiving device is not limited to receiving only. As described above, the receiving device may, for instance, transmit a NACK message to the transmitting device and the transmitting device may receive the NACK message. In general, the transmitting device is not limited to transmitting and the receiving device is not limited to receiving. In an embodiment, the transmitting device may be a base station and the receiving device may be a user equipment.

It is noted that the terms “receiving device” and “transmitting device” are not to be understood as limiting the respective devices to receiving or transmitting. The terms rather relate to the transmitting device transmitting data and retransmitting data and the term receiving device relates to receiving data and receiving re-transmitted data. However, the receiving device may also transmit and retransmit data and the receiving device may transmit ACK/NACK notifications or control signals to the transmitting device. Likewise, the transmitting device may receive ACK/NACK or any other control signals from the receiving device Furthermore, as noted above, the transmitting device may also be a user equipment in all embodiments and the receiving device may also be a base station. Likewise, both devices may be user equipment devices or any other wireless communication device.

Figure 9:
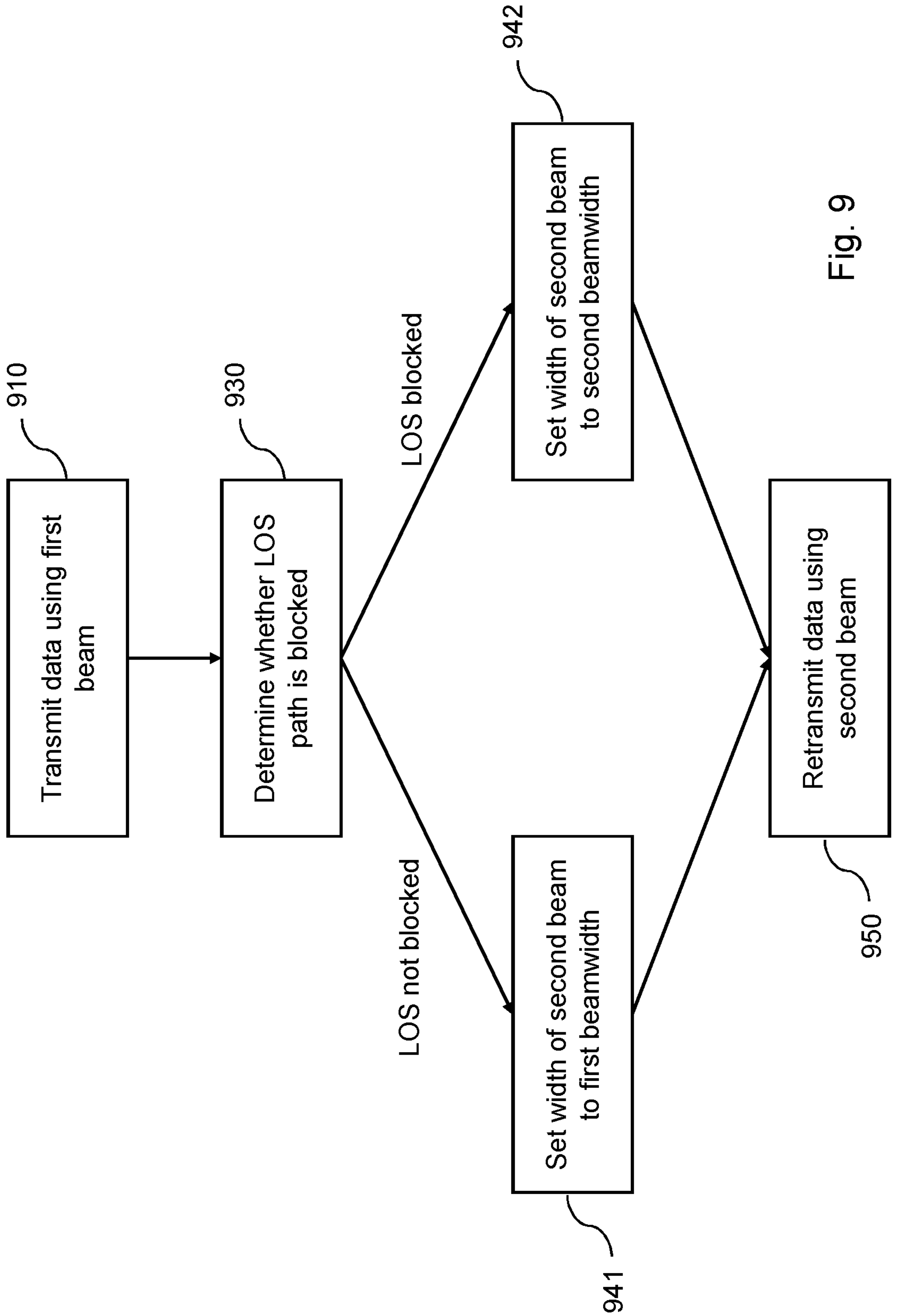
FIG. 9 is a flow diagram illustrating exemplary steps of a transmission and retransmission.

FIG. 9 shows a method according to an exemplary embodiment of the present disclosure to be carried out by a wireless device transmitting and possibly retransmitting data to another wireless device.

In a first step 910, the transmitting device transmits data to the receiving device using a first beam. This beam may be directed towards the LOS between the transmitting device and the receiving device.

In a next step 930, the transmitting device may determine whether the LOS between the transmitting device and the receiving device is blocked. The transmitting device sets in a next step 941 or 942 the width of a second beam to a width depending on whether it was determined that the LOS is blocked or not, and retransmits 950 the data to the receiving device.

Figure 10:
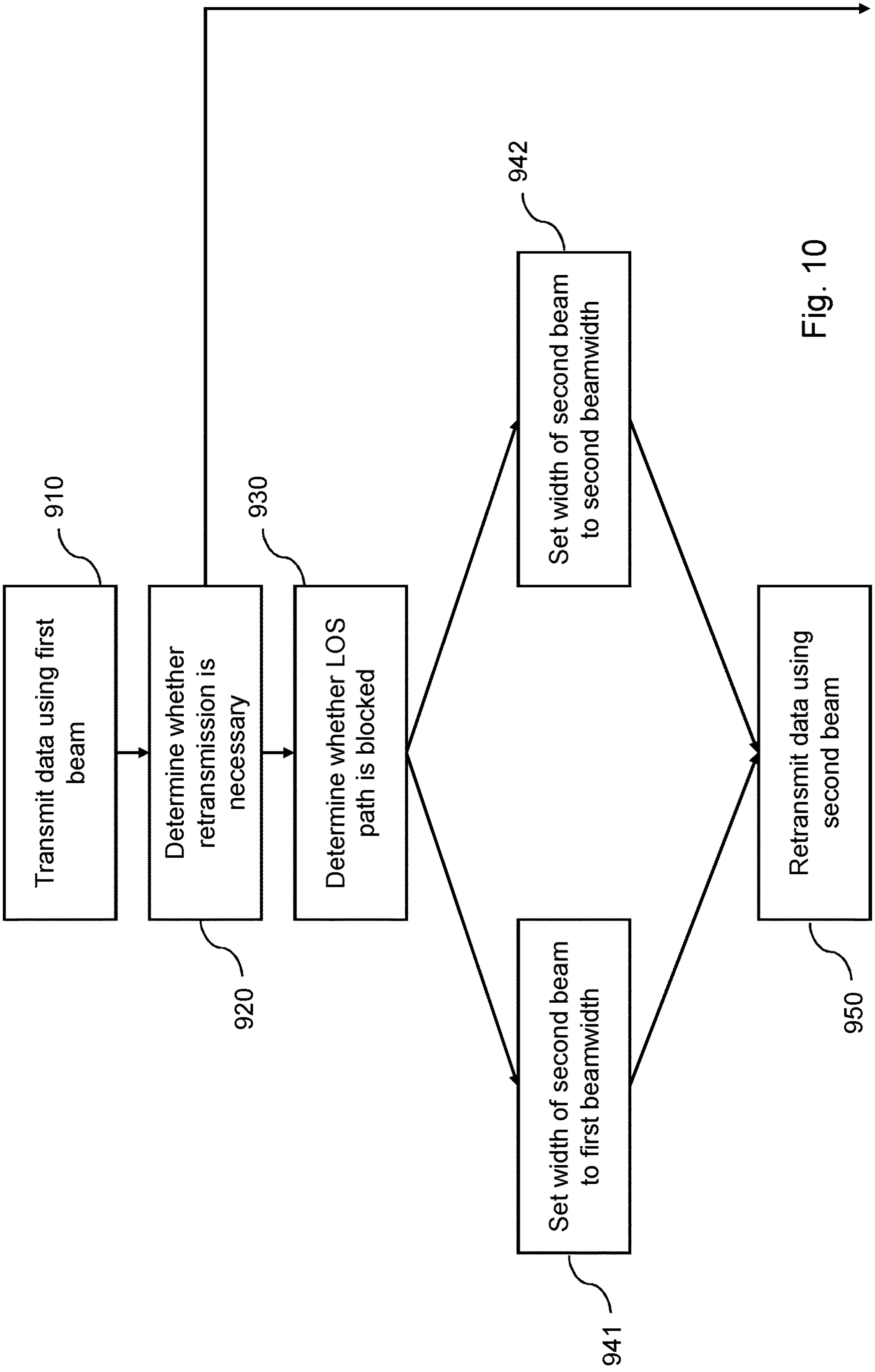
FIG. 10 is a flow diagram illustrating exemplary steps of a transmission and, if necessary, retransmission.

FIG. 10 shows an exemplary modification of the method according to the above-described exemplary embodiment. In an additional step 920, the transmitting device determines whether retransmission is necessary before determining whether the LOS between the transmitting device and the receiving device is blocked. This determining may be based on any transmission/retransmission protocol. When no retransmission is necessary, according to some embodiments, the transmitting device may refrain from determining whether the LOS is blocked.

In some embodiments, retransmission strategies are described that are compatible with HARQ protocol-based mm-wave.

Two main mechanisms may be used during retransmission, which comprise:

1. Changing the beamwidth: either to be narrower or wider based on the information from beam training and management stage, if there is no blockage or the blockage is there, respectively.
2. Changing the transmitted beam: based on the information from beam training and management stage. This is done based on whether there are different channel state information (CSI) during the transmission process.

Now, each mechanism will be described in more detail.

In the following, it is assumed that the initial transmission beam 400 is exemplarily presented in FIG. 5. The BS (or other transmitting device) will transmit to the UE (or other receiving device) using beam 400 as in FIG. 5. Then, the UE checks via forward error correction (FEC) if the data is or is not within the acceptable range of reliability. Then, the UE asks the BS to do transmission of the same data packet (retransmission). Here, the BS checks the information coming from the beam management and training phase. If there is no blockage, the retransmission strategy may be making the beam narrower as shown in FIG. 7.

Based on the information that comes from the beam management and training phase, if a blockage has existed, then the retransmission strategy may be making the beam wider as shown in FIG. 6.

Improved communication performance of the network may be achieved by increasing the SNR at the intended receiver. The system throughput may be increased more by connecting this with link and modulation adaption approaches based on beam space.

For example, link and modulation adaption may depend on the CSI. Taking advantage of MIMO, this approach may be done based on the beam space domain, where the beam specifications can be changed based on the channel to achieve more link reliability. So, if both can be adjusted (i.e., link adaption and modulation, and beam space), the throughput of the network may be increased.

In some embodiments, the transmission beam may be switched. In this case, the channel is changing by obtaining different CSI based on the information that is available from beam management and training. So, the BS will be able to choose the best beam (out of 1101 to 1103) for transmission based on the CSI (1111 to 1113) as exemplarily shown in FIG. 11. Each beam faces a different channel and the best beam is chosen to do the retransmission.

Figure 11:
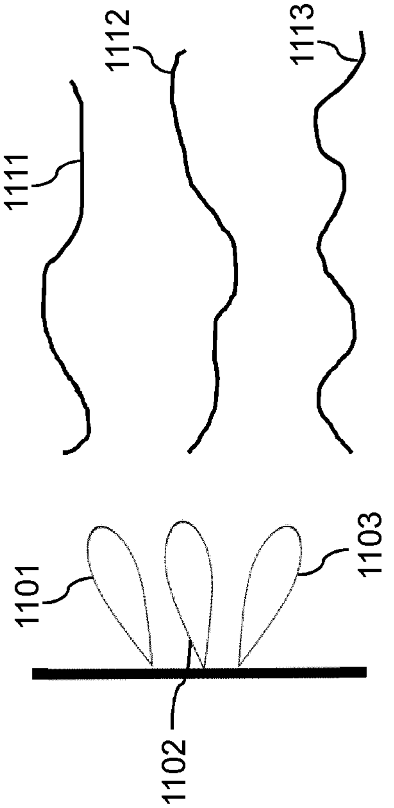
FIG. 11 is a schematic drawing of three different beams that are available for transmission and a measure of the respective channel quality.

FIG. 11 exemplarily shows three beams (1111 to 1113) each with a corresponding CSI (1101 to 1103). However, there may be two beams or any other number of beams with corresponding CSI available.

Switching the beam may be used as a retransmission strategy on its own or combined with any other embodiment of the present disclosure. For instance, switching the beam may be combined with changing the width of the beam.

Figure 12:
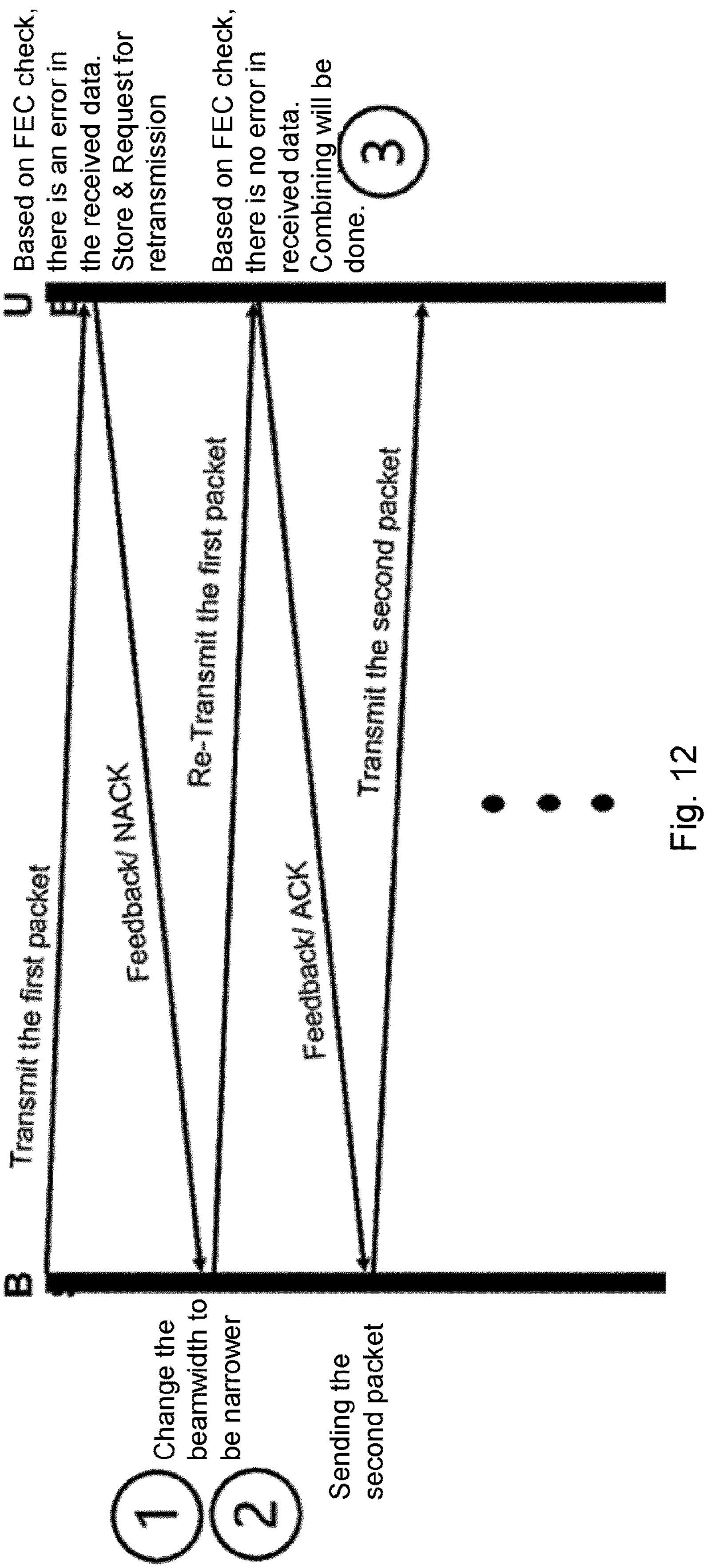
FIG. 12 is a schematic drawing of a transmission and retransmission process.

FIG. 12 shows an exemplary transmission/retransmission process. It is assumed that a UE and a BS are connected based on TDD mode.

The BS transmits the first packet to the UE. The UE receives the packet and, based on the FEC check and the reliability level of the system requirement, the UE stores and asks for retransmission of the same packet by sending feedback as a negative acknowledgment (NACK) to the BS. In a next step, the BS performs retransmission based on any of the strategies proposed in this disclosure.

For instance, the retransmission could be based on two strategies either changing the beam width or changing the beam itself. These strategies are represented by numbers one and two in FIG. 12. These numbers will be described below. After the BS has chosen the best strategy, the retransmission will be done. The UE does the FEC check. If there is no error in the received data, combining will be done. Here, the third strategy is used at the receiver side marked by the number three in FIG. 12. Then, the feedback/ACK is sent to the BS. The BS will transmit the second packet and so on.

Number one in FIG. 12 represents a way to improve the connection between the BS and the UE by making the beam narrower or wider based on the blockage state. This may allocate more power at the receiver, which may increase the SNR.

Number two in FIG. 12 relates to using the precoding design which is another factor that may play a role to increase the SNR. Choosing the best design based on the requirement of the network may increase the throughput in the network.

Number three in FIG. 12 represents the following analogy. The UE has one antenna. By doing retransmission, multiple copies of the same data are available at the receiver. This may provide diversity gain as well as channel gain if the channel is not static. Consequently, Virtual combining (VC) between these copies may be done. Furthermore, it may not be necessary to use a specific type of combining at the receiver as the conventional schemes may be used. Here, the optimum combining at the receiver might be based on the system requirements. It could be MMSE, selective combining, a new design based on the system requirements. In contrast with the conventional retransmission scheme, according to some embodiments, the combining may be done based on the PHY layer, which may make things easier and faster.

Beamforming design may have promising effects in next-generation millimeter wave (mmWave) MIMO systems where robust beamforming performance may be provided with a smaller cost and a smaller number of fully digital beamformers. Designing the beamformer is related to designing the precoder at the transmitter and the combiner at the receiver. This design may be based on an optimization problem that has an objective function. This objective function may reflect the requirements of the system, such as bit error rate, latency, connectivity, etc.

Embodiments may relate to designing the precoder at the transmitter to optimize the beam specification like the beamwidth. On the other hand, designing the combiner at the receiver is related to optimizing the combing approach based on the system requirements. For example, when a system has a bit error rate (BER) around 10^-6, the combiner filter may be designed to obtain this value. This gives the flexibility to design combining techniques based on the system requirements rather than applying conventional techniques.

According to some embodiments, the UE may have multiple antennas. In these embodiments, each antenna will have multiple copies of the message signal that provide a diversity gain to the system. If the number of antennas increases, the diversity gain may increase. If the diversity gain increases, the performance, and the reliability of the system may increase. Multiple antenna wireless communication systems may exploit multiple spatial channels in the transmission medium between the transmitter and the receiver, to simultaneously transmit multiple different information streams, or to simultaneously transmit multiple copies of the same information redundantly. In the first case, the capacity may be increased, and in the second case, the quality or robustness may be increased. Such multiple antenna wireless communication systems are known as MIMO systems, where there are multiple antennas at both ends. The multiple data streams can be referred to as MIMO channels or spatial channels, to distinguish from frequency or coding channels.

According to some embodiments, millimeter waves may be used. These kinds of waves have some features that make a difference in the context of conventional communication. Their relatively shorter wavelengths may result in higher path loss but at the same time allow packing more antenna elements into a compact size to generate narrower beams with higher beamforming gain. In the beam-space channel, inputs and outputs are beams instead of antenna elements, and they act as ports in the angular domain to which transmit power is allocated. Specifications of beams may be beamwidth, beam-gain, and transmitted beam-angle. Furthermore, angle of arrival (AoA) and angle of departure (AoD) may be used to adapt the retransmission features in an alternative implementation.

According to some embodiments, the SNR may be increased at the receiver due to changing the beamwidth, choosing the type of precoding design, and/or designing an improved combiner at the receiver. More SNR may provide more reliability in the network.

In some embodiments, precoding design is a factor that may play a significant role to increase the SNR. Choosing the best design based on the requirement of the network may increase the throughput in the network. An efficient precoding design may provide an improved SNR and more reliability. This may increase the overall system performance.

In some embodiments where the UE has one antenna, by doing retransmission multiple copies may be available at the receiver. This may provide diversity gain. Virtual combining (VC) between these copies may be done. Furthermore, VC may be done based on the beamforming approach. Any optimization method may be applied based on what is needed/wanted regarding the reliability of the system. This may provide the flexibility of using several methods of combining based on the system requirements.

Finally, feedback availability may be provided by exploiting the TDD mode in the mm-wave domain. By using MIMO beamforming, a beamforming gain may be achieved. Furthermore, channel gain as well as diversity gain may be achieved and may improve the system performance.

Generally, where the retransmissions constitute a large portion of transmission delay, a key point to reduce latency may be to increase robustness, so that the number of required retransmission is reduced.

According to some embodiments, a communication device is provided for wireless communication with another communication device, comprising: a transceiver section configured to transmit data to the other communication device using a first beam; and processing circuitry configured to determine whether the line of sight path to the other communication device is blocked, wherein the transceiver section is further configured to retransmit the data using a second beam, wherein when no blockage of the line of sight path is detected, the beamwidth of the second beam is set to a first width; and when a blockage of the line of sight path is detected, the beamwidth is set to a second width, wherein the second width is larger than the first width.

In some embodiments, the width of the first beam is smaller than the second width.

In some embodiments the width of the first beam is larger than the first width.

In some embodiments, the direction of the second beam is different from the direction of the first beam.

In some embodiments, the retransmission protocol is performed on the physical, PHY, layer.

In some embodiments, the circuitry is further configured to determine whether a retransmission is necessary, and if it is determined that no retransmission is necessary, the transceiver section is configured not to retransmit the data, and if it is determined that retransmission is necessary, the transceiver section is configured to retransmit the data using the second beam.

In some embodiments, said determining whether a retransmission is necessary is based on a feedback from the other communication device.

In some embodiments, the communication device is a base station and in other embodiments, the communication device is a user equipment.

Moreover, methods are provided comprising steps performed by any of the above-mentioned processing circuitry implementations.

According to some embodiments, a method is provided for wireless communication of a communication device with another communication device, comprising transmitting data to the other communication device using a first beam; and determining whether the line of sight path to the other communication device is blocked, retransmitting the data using a second beam, wherein when no blockage of the line of sight path is detected, the beamwidth of the second beam is set to a first width; and when a blockage of the line of sight path is detected, the beamwidth is set to a second width, wherein the second width is larger than the first width.

According to some embodiments, the width of the first beam is smaller than the second width.

According to some embodiments, the width of the first beam is larger than the first width.

Furthermore, according to embodiments, the direction of the second beam is different from the direction of the first beam.

In some embodiments of the method, the retransmission protocol is performed on the physical, PHY, layer.

In some embodiments, the method further comprises determining whether a retransmission is necessary, and if it is determined that no retransmission is necessary, the data is not retransmitted, and if it is determined that retransmission is necessary, the data is retransmitted using the second beam.

In some embodiments the determining whether a retransmission is necessary is based on a feedback from the other communication device.

In some embodiments, the method is a method of a base station communicating with another communication device.

In some embodiments, the method is a method of a user equipment communicating with another communication device. Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit, IC. According to some embodiments, the integrated circuit embedding the processing circuitry controls the transceiver via an interface.

Any of the apparatuses of the present disclosure may be embodied on an integrated chip.

Any of the above-mentioned embodiments and exemplary embodiments may be combined.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

The invention claimed is:

1. A communication device for wireless communication with another communication device, comprising:
- a transceiver section configured to transmit data to the other communication device using a first beam; and
- processing circuitry configured to determine whether a line of sight path to the other communication device is blocked,
- wherein the transceiver section is further configured to retransmit the data using a second beam, wherein
  - when no blockage of the line of sight path is detected, the beamwidth of the second beam is set to a first width; and
  - when a blockage of the line of sight path is detected, the beamwidth is set to a second width,
- wherein the second width is larger than the first width.

2. The communication device according to claim 1, wherein the width of the first beam is smaller than the second width.

3. The communication device according to claim 1, wherein
- the width of the first beam is larger than the first width.

4. The communication device according to claim 1, wherein the direction of the second beam is different from the direction of the first beam.

5. The communication device according to claim 1, wherein
- a retransmission protocol is performed on a physical, PHY, layer.

6. The communication device according to claim 1, wherein the circuitry is further configured to determine whether a retransmission is necessary, and
- if it is determined that no retransmission is necessary, the transceiver section is configured not to retransmit the data, and
- if it is determined that retransmission is necessary, the transceiver section is configured to retransmit the data using the second beam.

7. The communication device according to claim 6, wherein said determining whether a retransmission is necessary is based on a feedback from the other communication device.

8. The communication device according to claim 1, wherein
- the communication device is a base station.

9. The communication device according to claim 1, wherein
- the communication device is a user equipment.

10. A method for wireless communication of a communication device with another communication device, comprising:
- transmitting data to the other communication device using a first beam; and
- determining whether the line of sight path to the other communication device is blocked,
- retransmitting the data using a second beam, wherein
  - when no blockage of the line of sight path is detected, the beamwidth of the second beam is set to a first width; and
  - when a blockage of the line of sight path is detected, the beamwidth is set to a second width,
- wherein the second width is larger than the first width.

11. The communication method for wireless communication of a communication device with another communication device according to claim 10, wherein the width of the first beam is smaller than the second width.

12. The communication method for wireless communication of a communication device with another communication device according to claim 10, wherein
- the width of the first beam is larger than the first width.

13. The communication method for wireless communication of a communication device with another communication device according to claim 10, wherein the direction of the second beam is different from the direction of the first beam.

14. The communication method for wireless communication of a communication device with another communication device according to claim 10, wherein
- a retransmission protocol is performed on a physical, PHY, layer.

15. The communication method for wireless communication of a communication device with another communication device according to claim 10, further comprising:
- determining whether a retransmission is necessary, and
  - if it is determined that no retransmission is necessary, the data is not retransmitted, and
- if it is determined that retransmission is necessary, the data is retransmitted using the second beam.

16. The communication method for wireless communication of a communication device with another communication device according to claim 15, wherein the determining whether a retransmission is necessary is based on a feedback from the other communication device.

17. The communication method for wireless communication of a communication device with another communication device according to claim 10, wherein
- the communication device is a base station.

18. The communication method for wireless communication of a communication device with another communication device according to claim 10, wherein
- the communication device is a user equipment.

19. At least one non-transitory, computer-readable medium comprising programs instructions that, when executed by at least one processor, causes the at least one processor to perform the method of claim 10.

* * * * *